Feb. 16, 1960 H. A. GREENWALD 2,925,290
SELF-EQUALIZING SEAL FOR A ROTATING SHAFT
Filed May 16, 1956
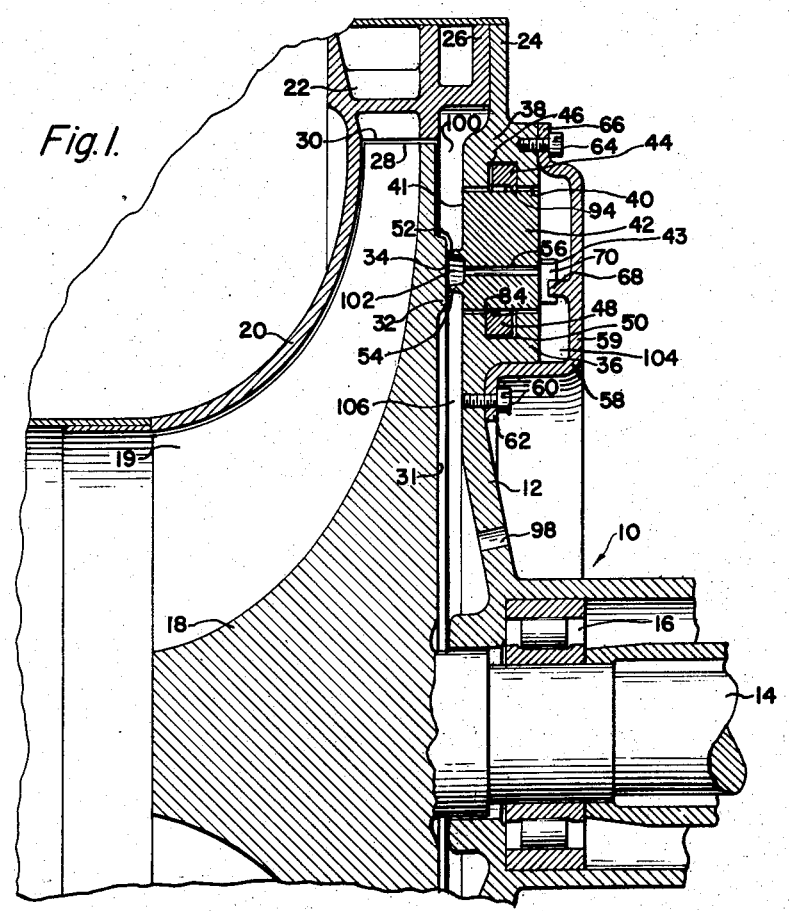
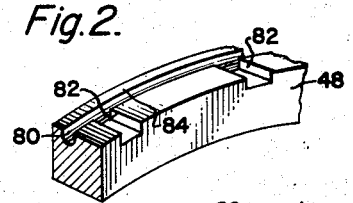
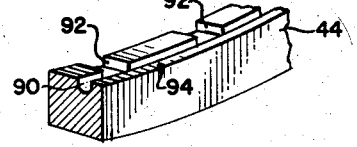
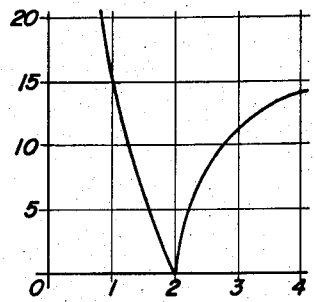
HAROLD A. GREENWALD,
INVENTOR.
BY

United States Patent Office 2,925,290
Patented Feb. 16, 1960

2,925,290

SELF-EQUALIZING SEAL FOR A ROTATING SHAFT

Harold A. Greenwald, Los Angeles, Calif., assignor to The Garrett Corporation, Los Angeles, Calif., a corporation of California Application May 16, 1956, Serial No. 585,274

4 Claims. (Cl. 286—8)

This invention pertains to rotating machinery and more particularly to controlled minimum clearance seals for such machinery.

In rotating machinery many problems arise in trying to provide efficient shaft seals or seals used for thrust balancing purposes, particularly in machinery handling pressurized fluids such as turbines, pumps and compressors. One of these problems is to provide an efficient seal which will allow a minimum of fluid leakage and yet have a minimum of wear and friction. In order to provide an efficient seal, it is necessary to maintain low seal friction losses in order to reduce the over-all friction of the machine. Excessive wear of various parts of the seal is also objectionable because it reduces the life and requires an undue amount of maintenance in order for the seal to operate efficiently. In addition, in some applications it is not possible to provide lubrication of the seal because of the incompatibility (because of temperature or chemical effects) of the fluid being handled with most known lubricants.

With these problems in mind, it is the principal object of this invention to provide a novel self-adjusting sealing device utilizing a non-rotating sealing ring which provides at least two pressure drops across the seal and requires no lubrication.

It is another object of this invention to provide a self-adjusting seal which has substantially no friction losses and is uniquely designed so that the fluid pressures resulting from the two pressure drops across the seal will adjust the seal to maintain desirable minimum clearances between the non-rotating member and the rotating member, thus limiting the fluid losses through the seal to an acceptable minimum.

It is another object of this invention to provide a self-adjusting seal which has substantially no wear, and, in addition, has novel means for automatically adjusting the clearance between the rotating and the non-rotating members to compensate for any wear or temperature effects which may occur in adjacent parts of the machine.

These and other objects and advantages of this invention will be more apparent to those skilled in the art from the following detailed description of a preferred embodiment when taken in conjunction with the attached drawing in which:

Fig. 1 is a partial longitudinal section of a turbine showing the construction of the seal of this invention as applied to a turbine;

Fig. 2 is a partial isometric view of the piston ring used for sealing the inner periphery of the non-rotating sealing ring of the seal;

Fig. 3 is a partial isometric view showing the construction of the piston ring used for sealing the outer periphery of the non-rotating seal ring of the seal;

Fig. 4 is a graph showing the restoring force in pounds which tends to return the seal ring to its designed clearance.

Referring now particularly to Fig. 1, there is shown a turbine unit having a turbine housing 10 which has an outwardly projecting radial portion 12 at one end thereof. A turbine shaft 14 is rotatably mounted in the turbine housing 10 by means of a bearing 16 and carries a turbine wheel 18 at one end. The turbine wheel 18 and shaft 14 are shown formed as an integral unit, but, of course, these two members can be formed as separate pieces and joined together by any desired means. The turbine wheel 18 is provided with a plurality of circumferentially spaced blades 19 which, on their open side, are adjacent to the turbine casing 20. The outer periphery of the outer casing 20 is provided with a suitable nozzle ring 22 which is designed to direct the flow of incoming gases over the turbine blades 19. The outer periphery of the radial portion 12 of the turbine housing terminates in a flange portion 24 which is sealed to a similar flange 26 formed on the turbine casing 20 adjacent the nozzle ring 22 by any desired means, such as a bolted gasket joint (not shown).

A considerable amount of radial clearance is provided between the outer periphery 28 of the turbine wheel 18 and the inner periphery 30 of the stationary nozzle ring 22 in order to compensate for the radial expansion of the turbine wheel caused by changes in the operating temperature of the turbine. This large radial clearance between the turbine wheel and the nozzle ring would allow a considerable amount of the incoming fluid to escape between the back side 31 of the turbine wheel and the turbine housing 10 unless an efficient sealing means is provided. Also, in some applications it is necessary to balance the thrust of the turbine wheel so that the thrust load on the bearings is reduced.

The sealing means of this invention consists of a non-rotating floating seal ring 42 which has two annular land type seals 52 and 54 which project axially from one side 41 adjacent a radial surface 34 which is formed on the back side of the turbine wheel 18. The two annular seals 52 and 54 provide for two distinct pressure drops of the fluid as it escapes along the back side of the turbine wheel 18. Means are provided in the seal for automatically adjusting the axial position of the seal ring 42 so that the clearance between the extreme ends of the annular seals 52 and 54 and the surface 34 of the turbine wheel is maintained at a minimum value without actual contact between the two surfaces. This automatic adjustment of the end clearance also provides a means for balancing the end thrust of the turbine wheel. The radial surface 34 is formed substantially perpendicular to the axis of rotation of the turbine shaft 14 on an annular portion 32 of the turbine wheel 18 which projects axially from the back side of the turbine wheel. The surface 34 could be inclined at an angle to the axis of the turbine shaft providing the axial length of the projecting annular seals 52 and 54 were changed accordingly.

The seal ring 42 is mounted in an annular opening 40 formed in the radial portion 12 of the turbine housing 10. The inner and outer peripheries of the annular opening 40 are provided with thicker wall sections 36 and 38, respectively, than the thickness of the remainder of the radial portion 12 of the turbine housing 10. Thickened portions 36 and 38 are required so that some sealing means may be incorporated in the turbine housing to seal the inner and outer peripheries of the seal ring member 42. The sealing means shown in Fig. 1 consists of two piston rings 44 and 48 which fit in cooperating grooves 46 and 50 formed in the thickened portions 36 and 38, respectively. The piston rings 44 and 48 are designed so that minimum friction will exist between the piston rings and the seal ring 42 when the seal ring 42 moves in an axial direction, as will be explained below.

The two annular seals are positioned so that the pressures existing on the various annular areas of the seal ring 42 will automatically maintain a minimum clearance between the extreme ends of the two annular seals 52 and 54 and surface 34 on the back side of the turbine wheel 18, as will be explained below also.

A plurality of circumferentially spaced equalizing passageways 56 are provided in the seal ring 42 so that the pressure existing in the annular space between the two seals 52 and 54 may have free access to the other radial surface 43 of the seal ring 42. The radial surface 43 of the seal ring 42 is enclosed by means of an annular casing 58. The radial wall 59 of the casing 58 is axially spaced from the side 43 of the seal ring 42 so as to enclose annular space 104. The casing 58 may be sealed to the radial portion 12 of the turbine housing 10 by any desired means such as a plurality of circumferentially spaced bolts 60 and 64 which pass through the radial flanges 62 and 66, respectively, and thread into the radial portion 12. Suitable gaskets may be positioned between the mating surfaces of the flanges 62 and 66 and the radial portion 12. Of course, the annular casing 58 could be formed integrally with the radial portion 12 of the turbine casing 10.

Possible rotation of the seal ring 42 is prevented by a plurality of bosses 68 which project axially from the inner surface of the wall 59 of the casing 58 and engage similar bosses 70 which project axially from the surface 43 of the seal ring 42. A pair of bosses 70 are provided for each boss 68 so that they limit the rotation of the seal ring 42 in each direction to the small amount of circumferential clearance between these bosses. In addition to preventing rotation of the seal ring 42, the extreme ends of the bosses 68 also serve to limit the axial movement of the seal ring 42.

A small portion of each of the piston rings 44 and 48 used for sealing the outer and inner peripheries of the seal ring 42 is shown in Figs. 2 and 3. The friction existing between the piston rings and the seal ring 42 is reduced to a minimum by providing a channel shaped relieved portion 80 on the surface of the piston ring 48 which engages the inner periphery of the seal ring 42. One of the legs of the channel 80 is provided with a plurality of circumferentially spaced slots 82 which project radially as shown in Fig. 2. The other leg 84 of the channel is left intact and thus seals the inner periphery of the seal ring 42. Piston ring 44, shown in Fig. 3, has a similar construction except that the channel shaped relief 90 is formed on the inner periphery of the piston ring inasmuch as this surface engages the outer periphery of seal ring 42. Piston ring 44 also has a plurality of slots 92 formed in one leg of the channel and one continuous leg 94. The piston rings are made so that the leg of the channel having the spaced slots is adjacent the high pressure side of the ring as shown in Fig. 1.

The above described construction of the piston rings 44 and 48 provides a maximum of bearing area but a minimum of surface area subject to the differential pressure in contact with the peripheries of the seal ring 42. The portion of the piston rings 44 and 48 is sufficient to maintain a positive seal between the radial portion 12 and the seal ring 42. By maintaining a minimum of surface area subjected to an unbalanced pressure in contact with peripheries of seal ring 42, the friction existing between the piston rings and the seal ring 42 will be reduced to a minimum, thus allowing the seal ring 42 to be moved in an axial direction with a minimum of force.

When the turbine shown in Fig. 1 is operating, the high pressure fluid will be admitted to the nozzle ring 22 to drive the turbine wheel 18. A portion of this high pressure fluid will escape between the outer periphery 28 of the turbine wheel and the inner periphery 30 of the nozzle ring. Thus the pressure in the annular space 100, adjacent the outer periphery of the turbine wheel, will be substantially the same as the pressure of the fluid in the clearance space between 28 and 30. This pressure will act on the annular portion of the seal ring 42 which projects radially outwardly from the annular seal 52. As the high pressure fluid tends to escape from the space 100 into the space 102 existing between the annular seals 52 and 54, its pressure will be reduced due to the small clearance existing between the extreme end of the annular seal 52 and the surface 34 of the back side of the turbine wheel. As the fluid escapes into the space 102, it will have free access to the radial surface 43 of the seal ring 42 through the equalizing passages 56. Thus the opposite radial surface of the seal ring 42 will be subjected to substantially the same pressure as exists in the space 102. From the space 102 the pressurized fluid will escape into the space 106 which surrounds the inner portion of the turbine wheel. In escaping into the space 106, the pressure of the fluid will again be reduced because of the small clearance existing between the annular seal 54 and the surface 34 of the turbine wheel. From the space 106 the small leakage of fluid will escape through vents 98 in the radial portion 12 of the turbine case 10 to the atmosphere surrounding the turbine or, depending on the type of machine, to the low pressure side of the system in which the turbomachine is used. Thus the surface of the seal ring 42 which projects radially inwardly from the annular seal 54 will be subjected to the same pressure as exists in space 106.

From the above description, it can be seen that the one radial surface 41 of the seal ring 42 is divided into three separate areas by the annular seals 52 and 54 which are subjected to three different pressures while the radial surface 43 is subjected to only one pressure. By the proper radial positioning of the annular seals 52 and 54, the three areas on the surface 41 can be proportioned so that the net force resulting from the various pressures acting on the various areas on opposite sides of the seal ring 42 will maintain it in a balanced axial position. Actual contact between the extreme ends of the annular seals 52 and 54 and the surface 34 of the turbine wheel is prevented by the resultant changes in the pressure in 102 and 104 as the seal ring 42 moves axially toward the turbine wheel. As the seal ring 42 moves toward the surface 34, the clearance between the extreme end of the annular seal 52 and the surface 34 will be reduced. As this clearance becomes less, the pressure in the space 102, and thus the pressure acting on the radial surface 43 of the seal ring 42, will be greatly reduced due to the reduced leakage of fluid past the annular seal 52 caused by the smaller clearance. This action will allow the high pressure fluid in the space 100 to move the seal ring 42 axially away from the surface 34. As the seal ring 42 moves away from the surface 34, the pressure in the space 102 will increase due to the increased clearance between the annular seal 52 and the surface 34. This increase in pressure will also increase the pressure acting on the radial surface 43 of the seal ring 42 and thus tend to move the seal ring 42 axially toward the surface 34 of the turbine wheel. It can thus be seen that by properly locating the radial position of the two annular seals 52 and 54, any desired clearance between the extreme ends of the annular seals and the surface 34 may be maintained. While a very small clearance can be maintained, actual contact between the non-rotating seal ring 42 and the rotating turbine wheel will be prevented because of the change in pressures on the various areas on opposite sides of the seal ring 42 as these parts approach each other. Thus the change in the net force acting on the seal ring 42 will move it in the direction required to maintain the desired minimum clearance.

Whenever the ring 42 moves too close or too far away from surface 34, a restoring force in the proper direction acts to maintain the desired small clearance and resultant small acceptable leakage. This restoring force, shown graphically in Fig. 4, will always be in a direction to restore seal ring 42 to its designed axial position. The horizontal axis of Fig. 4 represents clearance in units of one ten thousandth's part of an inch (.0001) and the vertical axis represents the restoring force in pounds. The seal ring on which Fig. 4 is based is designed for an axial clearance between the ends of the annular seals 52 and 54 and the surface 34 of .0002 inch. The seal ring 42 has an outside diameter of 3.750 inches and an inside diameter of 2.750 inches with an inlet pressure to the turbine wheel of 44.2 p.s.i.a. and atmospheric pressure surrounding the turbine. As can be seen in Fig. 4, if the clearance is reduced to .0001 inch, a restoring force of approximately 17 pounds tends to move the seal ring away from the surface 34 to re-establish the clearance of .0002 inch. If the clearance opens to .0003 inch, a restoring force of approximately 12 pounds will tend to close the clearance to re-establish the clearance of .0002 inch.

The above minimum clearance seal, in addition to sealing the back side of the turbine wheel, will also allow balancing of the end thrust of the turbine wheel. The end thrust of the turbine wheel can be balanced by the net force of the pressures existing on the back side of the turbine wheel. All that is necessary is to locate the seal ring so that the net force due to the area of the turbine wheel which extends radially outward from the annular seal 52, times the pressure in space 100, plus net force due to the area of the turbine wheel which extends radially in from the annular seal 52, times the pressure existing in space 106, is sufficient to balance the end thrust of the turbine wheel.

It is thus seen that this invention provides a novel self-adjusting sealing device which automatically maintains a designed minimum clearance between the stationary seal ring and the rotating member of the machine. The various parts of the seal will also adjust to maintain this designed minimum clearance when the dimensions of the various parts of the turbine change due to temperature or rotational effects. This is particularly important in gas turbines and the like whose dimensions change considerably when the turbine is operated. Thus the seal will operate over a wide range of conditions without requiring adjustment. Also, in addition to sealing the rotating machine, the sealing device of this invention can be so placed radially as to substantially eliminate all end thrust.

While but one specific embodiment of this invention has been described in detail, many modifications and changes will occur to those skilled in the art without departing from its spirit or scope. For example, instead of using piston rings to seal the inner and outer peripheries of the seal ring 42, other mechanical equivalents could be used. In some cases when seals which allow substantially zero leakage are used, it may be necessary to provide restricted passages through the seal ring 42 so that a controlled amount of fluid may escape from the space 104 to the space 106. Accordingly, this invention should not be limited to the specific embodiment described above but only as required by the prior art.

I claim:

1. A seal for rotating machinery comprising: a stationary casing member and a rotating member having a substantially radial surface; a ring shaped floating seal member having radial surfaces, said seal member mounted in said stationary member so as to permit movement parallel with the axis of rotation of said rotating member, said seal member in addition being sealed along its outer and inner peripheries to said stationary member; at least two annular lands projecting from the radial surface of said seal member adjacent said rotary member, said lands located radially inwardly of the outer periphery of said seal member and projecting in the direction of said rotating member; means for subjecting the portion of the radial surface of said seal member which is radially outward from said lands to a fluid pressure; said lands in cooperation with said radial surface of the rotating member forming an annular pocket; an opening through said seal member connecting said annular pocket with the other radial surface of said seal member; means for enclosing said other radial surface; and additional means for preventing rotation of said seal member.

2. A seal for rotating members comprising: a stationary member and a rotating member; said rotating member having a radial portion which extends substantially parallel to its axis of rotation; a floating member slidably mounted in said stationary member adjacent said radial portion, sealing means for sealing the inner and outer peripheries of said floating member to said stationary member, said floating member in addition being movable parallel with the axis of rotation of said rotating member; at least two radially spaced annular ring portions projecting axially from the side of said floating member adjacent the radial portion of said rotating member, said annular ring portions being spaced from the inner and outer periphery of said floating member; a passageway between the side of said floating member from which said annular ring portions project and the opposite side of said floating member connecting the space between said ring portions with said opposite side; casing means for hermetically enclosing the opposite side of said floating member; means for supplying a fluid under pressure to the portion of the side of said floating member from which said annular ring portions project which is radially outward from said annular ring portions; said fluid pressure being reduced when it flows around the outer annular ring portion and into the annular space between said ring portions and reduced further when it flows around the inner annular ring portion whereby said floating member assumes a position of equilibrium with said annular ring portions free of contact with said radial portion of said rotating member and means for venting fluid from the space adjacent the portion of the side of said floating member from which said annular ring portions project which is radially inward from said annular ring portions.

3. A shaft seal for rotating machinery comprising: a rotating shaft and housing; an outwardly projecting radial portion formed on said shaft; a seal ring mounted in said housing adjacent said radial portion, said seal ring being movable in a direction parallel to the axis of said shaft, sealing means for sealing the inner and outer peripheries of said seal ring, two spaced apart sealing members mounted on the face of said seal ring adjacent said radial portion, said sealing member being spaced from the inner and outer peripheries of said seal ring; the space between said two sealing members being in communication with the opposite face of said seal ring; casing means for enclosing said opposite face; and means for introducing a pressurized fluid outwardly of one of said sealing members and for venting said fluid inwardly of the other of said sealing members so that the pressure of said fluid will be reduced as it passes between said sealing members and said radial portion, the sealing members being positioned so that the pressures on the two sides of the seal ring will cause the seal ring to assume a position of equilibrium with said sealing members free of contact with said radial portion.

4. A seal for rotating machinery comprising: a casing; a rotating member rotatably supported in said casing, said rotating member having at least one radially extending surface; a floating annular seal member disposed in said casing for movement along the axis of said rotating member; at least two annular lands projecting axially from one radial surface of said floating seal member adjacent the radial surface on said rotating member said lands being spaced from the outer and inner peripheral surfaces of said annular seal member; a passageway means for connecting the other radial surface of said floating seal member with the portion of said one radial surface of said floating seal member between said two annular lands; sealing rings disposed in said casing for sealing the inner and outer peripheries of said floating member, said sealing rings having restricted passage means to permit a controlled leakage of fluids; means for introducing a fluid under pressure to the space surrounding said one radial surface of the floating member on one side of said annular lands and additional means for venting the space surrounding said one radial surface of the floating member on the other side of said annular lands.

References Cited in the file of this patent

UNITED STATES PATENTS

| | | |
|---|---|---|
| 1,315,822 | Doran | Sept. 9, 1919 |
| 2,555,492 | Kidney | June 5, 1951 |
| 2,672,357 | Voytech | Mar. 16, 1954 |
| 2,736,265 | Higgins | Feb. 28, 1956 |